May 20, 1941.     G. E. WILSON     2,243,025
CITRUS FRUIT JUICE EXTRACTING MACHINE
Filed March 6, 1940     2 Sheets-Sheet 2
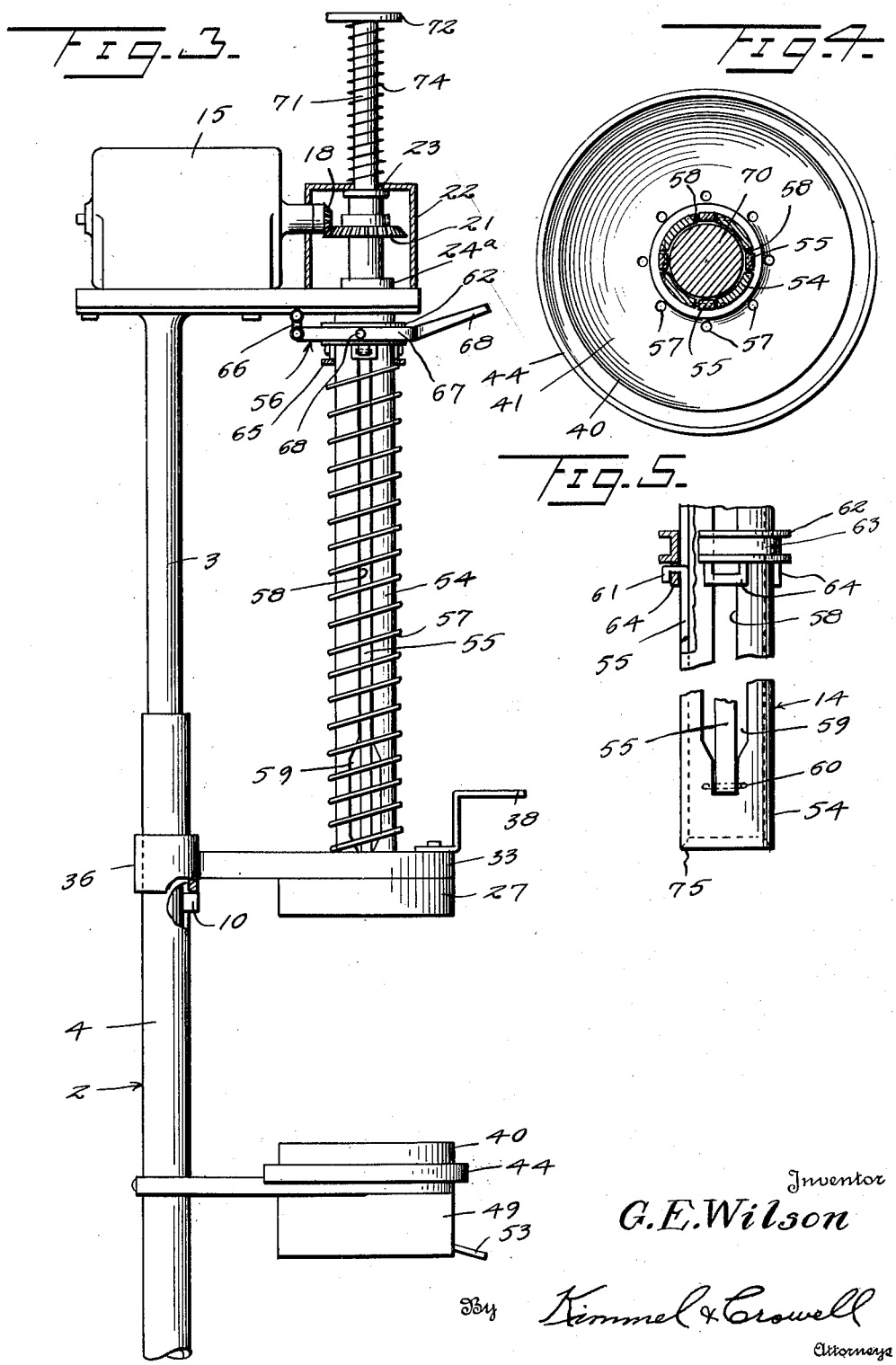
Inventor
G. E. Wilson
By Kimmel & Crowell
Attorneys Patented May 20, 1941

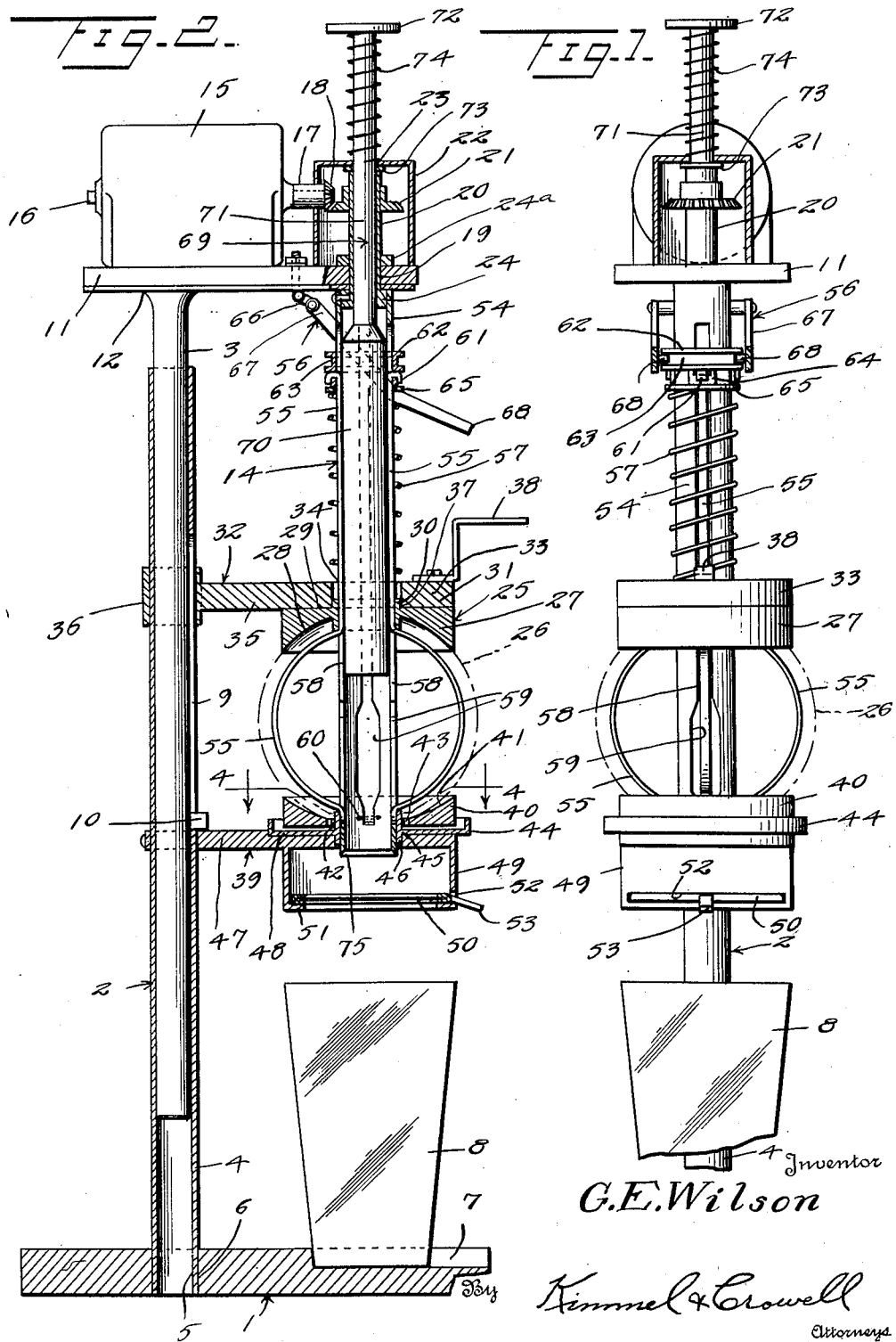

2,243,025

UNITED STATES PATENT OFFICE 2,243,025

CITRUS FRUIT JUICE EXTRACTING MACHINE

George E. Wilson, Fort Lauderdale, Fla., assignor to Wilson Citrus Fruit Juice Extracting Machine Incorporated, Fort Lauderdale, Fla.

Application March 6, 1940, Serial No. 322,605

11 Claims. (Cl. 146—3)

This invention relates to a citrus fruit juice extracting apparatus.

The invention aims to provide an apparatus, of the class referred to, for extracting the juice of citrus fruit without cutting the fruit in two or more parts and then subjecting the parts separately or collectively to the application of pressure to extract the juice, as is the case at present.

The invention further aims to provide an apparatus, of the class referred to, whereby the oil from the rind of the fruit does not become a part of the extracted juice.

The invention further aims to provide an apparatus, of the class referred to, including means operating within the fruit for extracting the juice from the latter without subjecting the fruit to a downward pressure applying action for juice extraction.

The invention further aims to provide an apparatus, of the class referred to, including revoluble resilient means operating within the fruit to extract the juice from the latter while the fruit is held stationary.

The invention further aims to provide an apparatus, of the class referred to, including means acting to core the fruit and subsequently to the coring, acting on the interior of the fruit for extracting the juice therefrom.

The invention further aims to provide an apparatus, of the class referred to, including a slidable revoluble structure acting as a corer and a juice extractor.

The invention further aims to provide an apparatus, of the class referred to, including means acting from within a cored fruit for extracting the juice from the latter while the fruit is held stationary.

The invention further aims to provide, in a manner as hereinafter set forth, an apparatus of the class referred to including contractible resilient means operating on and from within the fruit for extracting the juice from the latter.

The invention further aims to provide an apparatus, of the class referred to, operable upon a whole fruit while held stationary for extracting the fruit juice and preventing the oil from the rind of the fruit mixing with the extracted juice.

The invention further aims to provide an apparatus, of the class referred to, including means for coring the fruit, removing the core from the apparatus and then extracting the juice from the fruit by acting on the wall of the opening formed in the fruit by the removal of its core.

The invention further aims to provide an apparatus, of the class referred to, with means acting on the fruit from within the latter in a direction towards the rind to extract the juice while the fruit is held stationary.

The invention further aims to provide, in a manner as hereinafter set forth, an apparatus of the class referred to for extracting juice from the pulp of citrus fruits without subjecting the pulp and rind of the fruit to a simultaneous compressing action.

The invention further aims to provide, in a manner as hereinafter set forth, an apparatus for the purpose referred to, which is simple in its construction and arrangement, strong, durable, compact, sanitary, thoroughly efficient in its use, conveniently operated, readily assembled and disassembled when desired, and comparatively inexpensive to manufacture.

To the aforesaid aims and others which may hereinafter appear, the invention consists of the novel construction, combination and arrangement of parts as will be more specifically referred to and illustrated in the accompanying drawings, wherein is shown an embodiment of the invention, but it is understood that changes, variations and modifications may be resorted to which fall within the scope of the invention as claimed.

In the drawings:

Figure 1 is a front elevation, partly broken away, of the apparatus in position for extracting juice after the core of the fruit has been removed and discharged, Figure 2 is a vertical sectional view of the apparatus in the position as stated relative to Figure 1, Figure 3 is a side elevation, broken away, of the apparatus in normal position, Figure 4 is a section on line 4—4 Figure 2, and Figure 5 is a fragmentary view partly in vertical section and in side elevation of the combined fruit corer and juice extractor structure.

The apparatus includes a base 1 and a telescopic standard 2 formed of an upper and a lower tubular section 3, 4 respectively. The section 3 extends into the upper end of section 4. The latter has its lower terminal portion 5 anchored in the base 1 in proximity to one end of the latter, as at 6. The upper surface of the base 1 is formed with a cutout 7 providing a seat for a removable glass 8 into which the extracted juice is discharged. The section 4 is provided, lengthwise of one side thereof with an elongated slot 9 through which extends a key 10 carried by the section 3 acting to prevent the revolving of section 3 relative to section 4 and for limiting the extent of the downward movement of the section 3. The upper end of the section 3 is secured to the lower face of a platform 11, as at 12 at a point between the transverse median and one end of said platform.

The apparatus includes a driving means for the purpose of revolving elements of a combined corer and juice extractor structure 14 to be more fully referred to. The said driving means is in the form of an electric motor 15 secured upon the platform 11. The shaft 16 of the motor 15 is extended, as at 17. The extended portion 17 of shaft 16 is provided on its free end with a bevel pinion 18 for a purpose to be referred to. The platform 11 is formed with an opening 19 through which depends a vertically disposed suspended tubular shaft 20 having fixed thereto, in proximity to its upper end a beveled gear 21 which meshes with the pinion 18 whereby when motor 15 is active, shaft 20 will be revolved. The shaft 20 is the operating shaft of the combined corer and fruit juice extractor structure 14 to be referred to.

Mounted on and secured to the platform 11 and enclosing the pinion 18, upper portion of shaft 20 and the gear 21 is a housing 22. The latter is formed in its top with an opening 23 for a purpose to be referred to which is disposed coaxially with the axis of shaft 20. The lower end of shaft 20 is formed with a laterally disposed annular flange 24. The shaft 20 carries an annular boss 24ª secured to the platform 11 to arrest the said shaft moving downwardly independently of the platform.

The apparatus includes an upper vertically movable combined fruit positioning and clamping element or structure 25 which is adapted to abut the top of the fruit 26 and to further engage in said top axially of the latter. The element 25 also constitutes a guide for the corer of the corer and juice extractor structure 14, as well as an abutment for the controlling spring of said structure 14. The element 25 includes a plate 27 of circular form having a convexed lower surface 28 formed with an axial opening 29, and secured to the wall of the latter is a vertical guide sleeve 30, which slightly projects above the upper surface 31 of plate 27 and depends into the recess formed by said lower convexed surface 28. That portion of the sleeve 30 arranged in the recess formed by the surface 28 has a cutting edge engageable in the rind of the fruit for holding the latter in the desired position relative to element 25. The latter includes a carrier 32 for the plate 27 consisting of a body part 33 formed with an axial opening 34, a shank or arm 35 extended laterally from body part 33, a vertical sleeve 36 at the outer end of shank or arm 35, a rabbet 37 at the lower end of the wall of the opening 34 and an angle-shaped handle 38. The body part 33 is mounted upon and secured to plate 27. The upper part of sleeve 30 extends into the rabbet 37. That portion of the wall opening 34 above the rabbet 37 is flush with and forms a continuation of the inner face of the guide sleeve 30. The sleeve 36 at the outer end of the shank or arm 35 is slidably mounted on the standard section 4. The handle 38 is attached to and extends from said body part 33 and it is employed for elevating or lowering the element 25 when desired.

The apparatus includes a lower stationary combined positioning and fruit clamping element or structure 39 which is adapted to abut the bottom of the fruit 26 and to further engage in said bottom axially of the latter. The element 39 also constitutes a guide for the corer of the corer and juice extractor structure 14, as well as a means for collecting the oil from the rind of the fruit and to prevent said oil from mixing with the extracted juice. The element 39 further acts as a filter for the extracted juice before the latter passes into the glass 8. The element 39 includes a disc 40 having a concaved upper surface 41 forming a recess in which seats the bottom of the fruit 26. The disc 40 is formed with an axial opening 42 and adjacent said opening with a plurality of outlet ports 43 for the oil from the rind. Arranged below and of greater diameter than the disc 40 is a pan 44 constituting a collector for the oil which may be expelled from the rind of the fruit during the fruit juice extracting operation. The pan 44 encompasses in spaced relation the lower portion of the disc 40 and is formed with an axial opening 45 aligning with the opening 42. Secured, intermediate its ends to the walls of the openings 42, 45 is a vertically disposed guide sleeve 46 which not only functions as a guide for the corer of the structure 14, but also for suspending the disc 40 within the pan 44 whereby the bottom of disc 40 will be spaced from the upper face of the bottom of the pan 44. The sleeve 46 has a portion thereof projecting into the recess formed by the surface 41 of disc 40, and such portion has a cutting edge for the purpose of engaging in the rind of the fruit to hold the latter in an upright position and in the desired position to have the element 25 abut and engage in the top of the fruit whereby the latter will be held in position, to be operated upon for the extraction of the juice from its pulp.

The element 39 includes a fixed support 47 upon the upper face of which is secured the pan 44, and such face is cutout, as at 48, in which is mounted the pan. The support 47 is fixedly secured to standard section 4 and extends laterally therefrom. The support 47 is formed with an opening 48 which aligns with the opening 45 and into said opening 48 is arranged the lower portion of the sleeve 46. The plate 27 of the element 25 aligns with the disc 40 of the element 39. The sleeve 46 of the element 39 aligns with the sleeve 36 of the element 25.

The element 39 includes an open bottom holder 49 for supporting a removable strainer or filter 50. The holder 49 is secured to and depends from the support 47 and is formed with inwardly extending flanges 51 at its lower end upon which the strainer 50 is slidably mounted. The holder is provided with a slot 52 in one of its walls for the insertion therein and removal therefrom of the strainer 51. The latter is formed with a handle 53.

The structure 14 includes the shaft 20, as well as a revoluble tubular corer 54, a plurality of bodily revoluble resilient juice extracting members 55, a setting device 56 for the members 55, and a controlling spring 57 for restoring the structure 14 to its normal position, as well as for confining the extracting members in the body of the corer 54.

The flange 24 on the shaft 20 is arranged within the upper end of and secured to the corer 54 to thereby provide for the revolving of the corer in unison with said shaft. The corer 54 is formed lengthwise thereof with elongated slots corresponding in number to the number of juice extracting members 55 and as shown by way of example the corer is formed with four of such slots to accord with the number of members 55. The said slots are indicated at 58 and in proximity to the lower end of each slot the latter is enlarged, as at 59. The enlarged portions 59 of said slots constitute outlets for the juice extracted from the pulp of the fruit. Each of the members 55 is in the form of a strap like spring arranged within a slot 58 lengthwise of the latter. The lower end of each member 55 is pivotally connected to the corer 54, as at 60. The upper end of each member 55 is formed with an outwardly directed laterally extending hook 61.

The setting or depressing device 56 which is common to the members 55 is in the form of a vertically movable ring 62 slidably mounted about the upper portion of corer 54 and formed in its outer face with an endless groove 63. The ring 62 has depending from its bottom edge a series of spaced yokes 64 which are engaged by the hooks 61 for the purpose of coupling members 55 to said ring. Positioned against the bottoms of the yokes 64 and mounted on corer 54 is a washer 65. Pivotally suspended from the platform 11, as at 66, is a depressor 67 having oppositely inwardly extending pins 68, intermediate its ends arranged within the groove 63 in the ring 62. The depressor 67 is slidably mounted in the ring 62 and is formed with a handle 68. On swinging the handle 68 downwardly the pins 68 bearing on the lower wall of the groove 63 will lower the ring 62 on the corer 54 for a purpose to be referred to.

The controlling spring 57 is of spiral form and disposed about the corer 54 between the washer 65 and the body part 33 of the carrier 32. The coils of spring 57 act to maintain the members 55 in the slots 58 of the corer 54.

The apparatus includes a vertically disposed spring controlled expeller 69 for the core removed from the fruit by the corer 54. The expeller 69 includes a plunger 70 which is slidably mounted in the corer 54, a rod 61 connected at its lower end to the upper end of the plunger 70. The rod 71 is of less diameter than the plunger, extends upwardly through and extends above the shaft 20. The rod 71 passes through the opening 23 of housing 22 and at its upper end is provided with a hand or finger grip 72. Seated on the upper end of shaft 20 is a washer 73 and interposed between the latter and the grip 72, as well as surrounding the rod 71 is a coiled controlling spring 74 for the expeller 69. The diameter of the plunger 70 corresponds substantially to the inner diameter of the corer 54. The latter has a cutting edge 75 at its lower end.

The normal position of the apparatus is as shown by Figure 3 and which is provided for by the expansion of spring 57. When the apparatus is in normal position the structure 25 is supported by the key or stop 10. The fruit to be acted upon is first secured in the upper surface of the disc 40, and after the fruit has been positioned, the standard section 3 is lowered until its movement is arrested by the stop or key 10 abutting the shank or arm 47. Prior to the lowering of standard section 3 the strainer 50 is removed and after which the motor is made active to throw into operation the corer 54. As standard section 3 lowers, due to a downward pushing action on motor 15, the spring 57 moves downwardly bearing against structure 25. When the downward movement of the structure 25 is arrested by the fruit arranged in structure 39, the spring 25 compresses from its lower end, but the setting or depressing device 56 remains in the position as shown by Figure 3. As the standard section 3 continues to move downwardly, after the stoppage of structure 25, the corer 54 is carried therewith and passes through the fruit to core the latter. The extent of movement of the corer 54 is such that it will enter the upper portion of the holder 49. At this point, the portions of the apparatus which have been moved downwardly are held in such position and the expeller 69 is then forced downwardly into the corer 54 to an extent to expel the core from the apparatus through the open bottom of the holder 49. After the core has been expelled, the strainer 50 is positioned in the holder and while the lowered parts of the apparatus are still held downwardly, the setting or depressing device 56 is moved to and held in the position as shown by Figure 2 to thereby provide for the bowing of the lower portions of the members 55, which are bodily revolving with the corer 54 to thereby provide for such bowed portions acting on the pulp of the fruit to result in the extraction of the fruit juice, and such juice will pass through the enlarged portions 59, of the slots 58 into the corer 54 and be discharged therefrom for passage through the strainer into the glass. The latter is not positioned to receive the juice until after the fruit has been cored. When the downward applied pressure has been removed from the motor 15, the spring 57 will depend and elevate platform 11 and the parts carried thereby. The structure 25 is elevated by the operator grasping handle 38 and lifting said structure. The members 55 are distorted or bowed by the lower end of guide sleeve 30.

What I claim is:

1. In a fruit juice extracting means, a depressible tubular coring member for extension axially through the fruit and being formed with spaced lengthwise extending slots, means for rotating said member, spaced resilient extractors for the fruit juice bodily carried with said member and having the major portion of their length normally arranged in said slots, said extractors having their inner ends disposed within and connected to said member in proximity to the inner end of the latter and their outer ends arranged in outward lateral relation with respect to said slots, said elements having parts thereof projectable from said member outwardly through said slots into the fruit for removing the juice from the latter, and depressible means slidably mounted on said member and connected to the outer ends of said extractors for projecting the said parts for juice extraction.

2. In a fruit extracting means, a normally spring sustained depressible tubular coring member open at each end for extension axially through the fruit and being formed with spaced lengthwise extending slots, means for rotating said member, resilient extractors for the fruit juice bodily carried with said member having the major portion of their length normally arranged in said slots, said extractors having their inner ends disposed within and connected to said member in proximity to the inner end of the latter and their outer ends arranged in lateral outward relation with respect to said slots, said elements having parts thereof projectable from said member outwardly through said slots into the fruit for removing the juice from the latter, normally spring sustained depressible means slidably mounted on said member and connected to the outer ends of said extractors for projecting the said parts for juice extraction, and each of said slots having lengthwise thereof a wide part arranged in the inner terminal portion of said member to constitute an outlet for the extracted juice.

3. A juice extracting means comprising a standard, a depressible combined fruit corer and extracted juice conducting off member, means slidably mounting said member on said standard, means for rotating said member, a pair of superposed axially apertured holding elements coacting to hold the fruit and constituting guiding means for said member, said elements being carried by said standard, the lower one of said elements being stationary and the upper one vertically adjustable, a plurality of elongated resilient juice extractors disposed in and lengthwise of said member having their inner ends pivoted to said member within the latter, a coiled spring encompassing said member, bearing at one end against said upper element and normally confining said extractors in the body of said member, a combined spring compressing collar and projecting means for said extractors slidable on said member, and means for shifting said collar lengthwise of said member against the action of said spring to thereby project that portion of each extractor between said elements outwardly of said member for juice extraction.

4. A juice extracting means comprising a standard, a depressible combined fruit corer and extracted juice conducting off member, means slidably mounting said member on said standard, means for rotating said member, a pair of superposed axially apertured holding elements coacting to hold the fruit and constituting guiding means for said member, said elements being carried by said standard, the lower one of said elements being stationary and the upper one vertically adjustable, a plurality of elongated resilient juice extractors disposed in and lengthwise of said member having their inner ends pivoted to said member within the latter, a coiled spring encompassing said member, bearing at one end against said upper element and normally confining said extractors in the body of said member, a combined spring compressing collar and projecting means for said extractors slidable on said member, and means for shifting said collar lengthwise of said member against the action of said spring to thereby project that portion of each extractor between said elements outwardly of said member for juice extraction, each of said slots having an enlarged lower portion providing an outlet for the extracted juice.

5. A juice extracting means comprising a standard, a depressible combined fruit corer and extracted juice conducting off member, means slidably mounting said member on said standard, means for rotating said member, a pair of superposed axially apertured holding elements coacting to hold the fruit and constituting guiding means for said member, said elements being carried by said standard, the lower one of said elements being stationary and the upper one vertically adjustable, a plurality of elongated resilient juice extractors disposed in and lengthwise of said member having their inner ends pivoted to said member within the latter, a coiled spring encompassing said member, bearing at one end against said upper element and normally confining said extractors in the body of said member, a combined spring compressing collar and projecting means for said extractors slidable on said member, means for shifting said collar lengthwise of said member against the action of said spring to thereby project that portion of each extractor between said elements outwardly of said member for juice extraction, each of said slots having an enlarged lower portion providing an outlet for the extracted juice, and a spring controlled vertically movable core expeller extending into and slidable relative to said member, said expeller being permanently extended from the upper end of said member.

6. A juice extracting means comprising a standard, a depressible combined fruit corer and extracted juice conducting off member, means slidably mounting said member on said standard, means for rotating said member, a pair of superposed axially apertured holding elements coacting to hold the fruit and constituting guiding means for said member, said elements being carried by said standard, the lower one of said elements being stationary and the upper one vertically adjustable, a plurality of elongated resilient juice extractors disposed in and lengthwise of said member having their inner ends pivoted to said member within the latter, a coiled spring encompassing said member, bearing at one end against said upper element and normally confining said extractors in the body of said member, a combined spring compressing collar and projecting means for said extractors slidable on said member, means for shifting said collar lengthwise of said member against the action of said spring to thereby project that portion of each extractor between said elements outwardly of said member for juice extraction, the said lower element being provided with a collector for oil expelled from the rind of the fruit and means closed to and spaced from said member for conducting the oil to the collector, and said lower element including a strainer for the extracted juice arranged below said collector and into which said member discharges the juice.

7. A juice extracting means comprising a standard, a depressible combined fruit corer and extracted juice conducting off member, means slidably mounting said member on said standard, means for rotating said member, a pair of superposed axially apertured holding elements coacting to hold the fruit and constituting guiding means for said member, said elements being carried by said standard, the lower one of said elements being stationary and the upper one vertically adjustable, a plurality of elongated resilient juice extractors disposed in and lengthwise of said member having their inner ends pivoted to said member within the latter, a coiled spring encompassing said member, bearing at one end against said upper element and normally confining said extractors in the body of said member, a combined spring compressing collar and projecting means for said extractors slidable on said member, means for shifting said collar lengthwise of said member against the action of said spring to thereby project that portion of each extractor between said elements outwardly of said member for juice extraction, each of said slots having an enlarged lower portion providing an outlet for the extracted juice, the said lower element being provided with a collector for oil expelled from the rind of the fruit, and means closed to and spaced from said member for conducting the oil to the collector, and said lower element including a strainer for the extracted juice arranged below said collector and into which said member discharges the juice.

8. A juice extracting means comprising a standard, a depressible combined fruit corer and extracted juice conducting off member, means slidably mounting said member on said standard, means for rotating said member, a pair of superposed axially apertured holding elements coacting to hold the fruit and constituting guiding means for said member, said elements being carried by said standard, the lower one of said elements being stationary and the upper one vertically adjustable, a plurality of elongated resilient juice extractors disposed in and lengthwise of said member having their inner ends pivoted to said member within the latter, a coiled spring encompassing said member, bearing at one end against said upper element and normally confining said extractors in the body of said member, a combined spring compressing collar and projecting means for said extractors slidable on said member, means for shifting said collar lengthwise of said member against the action of said spring to thereby project that portion of each extractor between said elements outwardly of said member for juice extraction, each of said slots having an enlarged lower portion providing an outlet for the extracted juice, a spring controlled vertically movable core expeller extending into and slidable relative to said member, said expeller being permanently extended from the upper end of said member, the said lower element being provided with a collector for oil expelled from the rind of the fruit and means closed to and spaced from said member for conducting the oil to the collector, and said lower element including a strainer for the extracted juice arranged below said collector and into which said member discharges the juice.

9. In an apparatus for the purpose referred to, a stationary base structure including a lengthwise slotted tubular standard, a horizontally disposed axially apertured stationary lower fruit holder suspended from said standard for supporting the fruit to be acted upon and a vertically movable axially apertured horizontally disposed upper fruit holder slidably mounted on the standard, arranged in superposed relation with respect to and for seating on the fruit supported by the lower holder; and a normally spring sustained depressible super-structure disposed in telescopic relation with respect to said standard and including a composite rotatable means for slidably extending into said holders and through the fruit between the latter, an operating means for said composite means, said composite means being formed of a tubular corer provided with slots lengthwise thereof and spaced distortable fruit extractors mounted in said slots and pivoted at their lower ends to said corer, said super-structure including a normally elevated spring controlled depressible distorting means for the extractors, said distorting means encompassing the corer, connected to the outer ends of said extractors and coacting with said upper holder for distorting parts of the latter for juice extraction, said superstructure having means coacting with said slotted standard to arrest revolving thereof relative to said base structure, and said holders providing guiding means for said composite member.

10. In an apparatus for the purpose referred to, a stationary base structure including a lengthwise slotted tubular standard, a horizontally disposed axially apertured stationary lower fruit holder suspended from said standard for supporting a whole fruit to be acted upon, a vertically movable axially apertured horizontally disposed upper fruit holder slidably mounted on the standard, arranged in superposed relation with respect to and for seating on the whole fruit supported by the lower holder, a normally spring sustained depressible superstructure disposed in telescopic relation with respect to said standard and including a composite rotatable means for slidably extending into said holders and through the fruit between the latter, an operating means for said composite means, said composite means being formed of a tubular corer provided with slots lengthwise thereof and spaced distortable fruit extractors mounted in said slots and pivoted at their lower ends to said corer, said superstructure including a normally elevated spring controlled depressible distorting means for the extractors, said distorting means encompassing the corer, connected to the outer ends of said extractors exteriorily of said corer and coacting with said upper holder for distorting parts of the extractors for juice extraction, said superstructure having means coacting with said slotted standard to arrest revolving thereof relative to said base structure, and said holders providing guiding means for said composite member, the slots in said corer having wide parts in proximity to their inner ends constituting outlets for the extracted juice.

11. In an apparatus for the purpose referred to, a stationary base structure including a lengthwise slotted tubular standard, a horizontally disposed axially apertured stationary lower fruit holder suspended from said standard for supporting the fruit to be acted upon, and a vertically movable axially apertured horizontally disposed upper fruit holder slidably mounted on the standard, arranged in suspended relation with respect to and for seating on the fruit supported by the lower holder; and a normally spring sustained depressible superstructure disposed in telescopic relation with respect to said standard and including a composite rotatable means for slidably extending into said holders and through the fruit between the latter, an operating means for said composite means, said composite means being formed of a tubular corer provided with slots lengthwise thereof and spaced distortable fruit extractors mounted in said slots and pivoted at their lower ends to said corer, said superstructure including a normally elevated spring controlled depressible distorting means for the extractors, said distorting means encompassing the corer, connected to the outer ends of said extractors and coacting with said upper holder for distorting parts of the latter for juice extraction, said superstructure having means coacting with said slotted standard to arrest revolving thereof relative to said base structure, and said holders providing guiding means for said composite member, said lower holder being provided with a collector for oil expelled from the rind of the fruit and a strainer for the extracted juice arranged below the collector.

GEORGE E. WILSON.